March 31, 1953 H. L. KRAEFT 2,633,378
JUVENILE VEHICLE BODY CONSTRUCTION
Filed Sept. 8, 1949 4 Sheets-Sheet 1

INVENTOR.
HERMAN L. KRAEFT
BY Fay, Golrick & Fay
ATTORNEYS

March 31, 1953 — H. L. KRAEFT — 2,633,378
JUVENILE VEHICLE BODY CONSTRUCTION
Filed Sept. 8, 1949 — 4 Sheets-Sheet 2

INVENTOR.
HERMAN L. KRAEFT
BY Fay, Golrick & Fay
ATTORNEYS

March 31, 1953  H. L. KRAEFT  2,633,378
JUVENILE VEHICLE BODY CONSTRUCTION
Filed Sept. 8, 1949  4 Sheets-Sheet 3

INVENTOR.
HERMAN L. KRAEFT
BY Fay, Gobrick & Fay
ATTORNEYS

March 31, 1953     H. L. KRAEFT     2,633,378
JUVENILE VEHICLE BODY CONSTRUCTION
Filed Sept. 8, 1949     4 Sheets-Sheet 4

INVENTOR.
HERMAN L. KRAEFT
BY Fay, Golrick & Fay
ATTORNEYS

Patented Mar. 31, 1953

2,633,378

UNITED STATES PATENT OFFICE 2,633,378

JUVENILE VEHICLE BODY CONSTRUCTION

Herman L. Kraeft, Cleveland Heights, Ohio, assignor to The Murray-Ohio Manufacturing Company, Cleveland, Ohio, a corporation of Ohio Application September 8, 1949, Serial No. 114,575

2 Claims. (Cl. 296—28)

This invention pertains to improvements in juvenile vehicle bodies formed of pressed sheet metal and the general object is to provide a body construction which will withstand the abuses incident to juvenile use and neglect while being held within practical overall weight limits.

More specifically, the present invention is concerned with the provision of a juvenile vehicle body constructed out of comparatively deep drawn sheet metal members so formed, fabricated and finished that an attractive, sturdy vehicle body of appealing appearance, can be produced in large volume in an economic manner.

A further object is to provide a durable hood, front fender and front grill construction consisting of two drawn, relatively thin sheet metal members so formed relative to each other as to result in a complete and strong body front when the two members are joined together.

A further object is the provision of an improved seat structure built into the body structure in such a manner as to increase lateral bracing of the lower portions of the sides intermediate the front and rear fender portions of the sides.

A still further object of the present invention is to so form and construct the body parts that front and rear bumper constructions will be provided in a manner incidental to the formation of the body parts in a drawing press.

Other objects and advantages of the invention will be apparent from the following description of a preferred form of the invention, reference being made to the accompanying drawings wherein.

In my Patent 2,036,813, issued April 7, 1936, I disclosed a juvenile body construction wherein appear one-piece side body members which also constitute integral wheel fenders. I also showed in that patent a drawn one-piece or integral hood and sides. While the body constructions there disclosed have merit and large numbers of juvenile vehicles have been produced incorporating the same, the front end constructions were such that it was necessary to use accessories in the form of external bumpers and mounting brackets if the front and rear parts of the vehicle body were to be protected against abuse and mishaps. In the present construction I have devised a way of incorporating bumper constructions as integral parts or portions of the body members both fore and aft of the body construction, which can be accomplished without the involvement of additional weight or additional steps or labor in the production of the body. The arrangements and shapes of the fender formations are such as to retain the advantages of the side constructions disclosed in my said Patent 2,036,813, while permitting the use of a new front panel formation somewhat in simulation of the general appearance of modern automobile designs. This front panel structure is such as to increase the strength of the fore part of the hood structure. Furthermore, I find that the bottoms or lower portions of the fender formations, and, if desired, the entire lower portions of the side structures can be materially strengthened by a continuation of the integral bumper formations without detracting from the overall appearance of the vehicle. By an improved arrangement of the sheet metal members comprising the seat structure, I also find that I can obtain a material stiffening of the intermediate portions of the continuous sides. The mechanical arrangement of the parts is such as to afford latitude in the styling or appearance in designing of the body, which is an important factor in the production and successful selling of children's vehicles.

In my co-pending application Serial No. 114,576 filed on even date herewith I have disclosed a front and rear bumper construction of the juvenile vehicle body which reinforces the front and rear regions and will enhance the appearance of the vehicle body.

Figure 1:
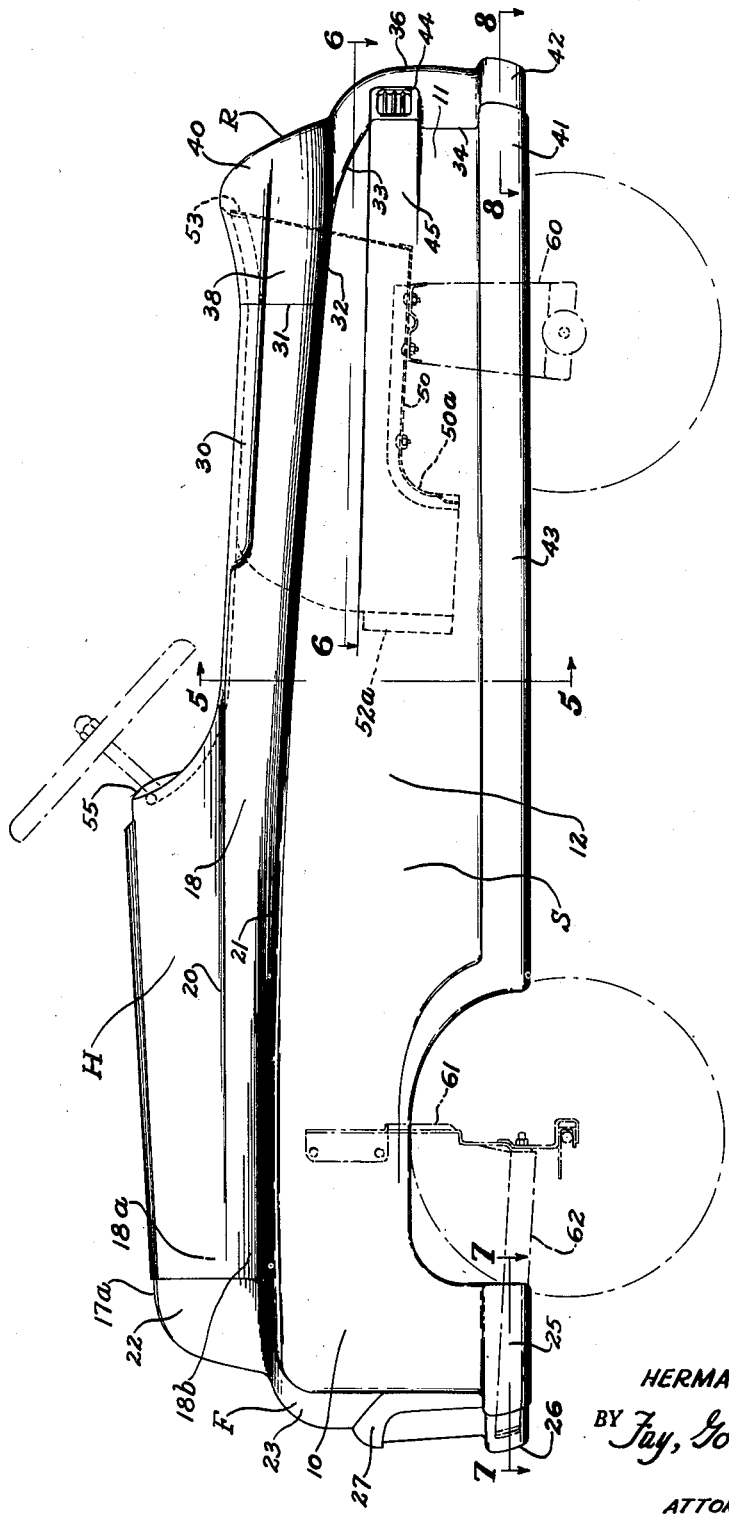
Fig. 1 is a side elevation of a juvenile automobile with my new body structure shown in full lines and the wheels and mountings therefor and the steering gear represented in dot and dash lines.
Figure 2:
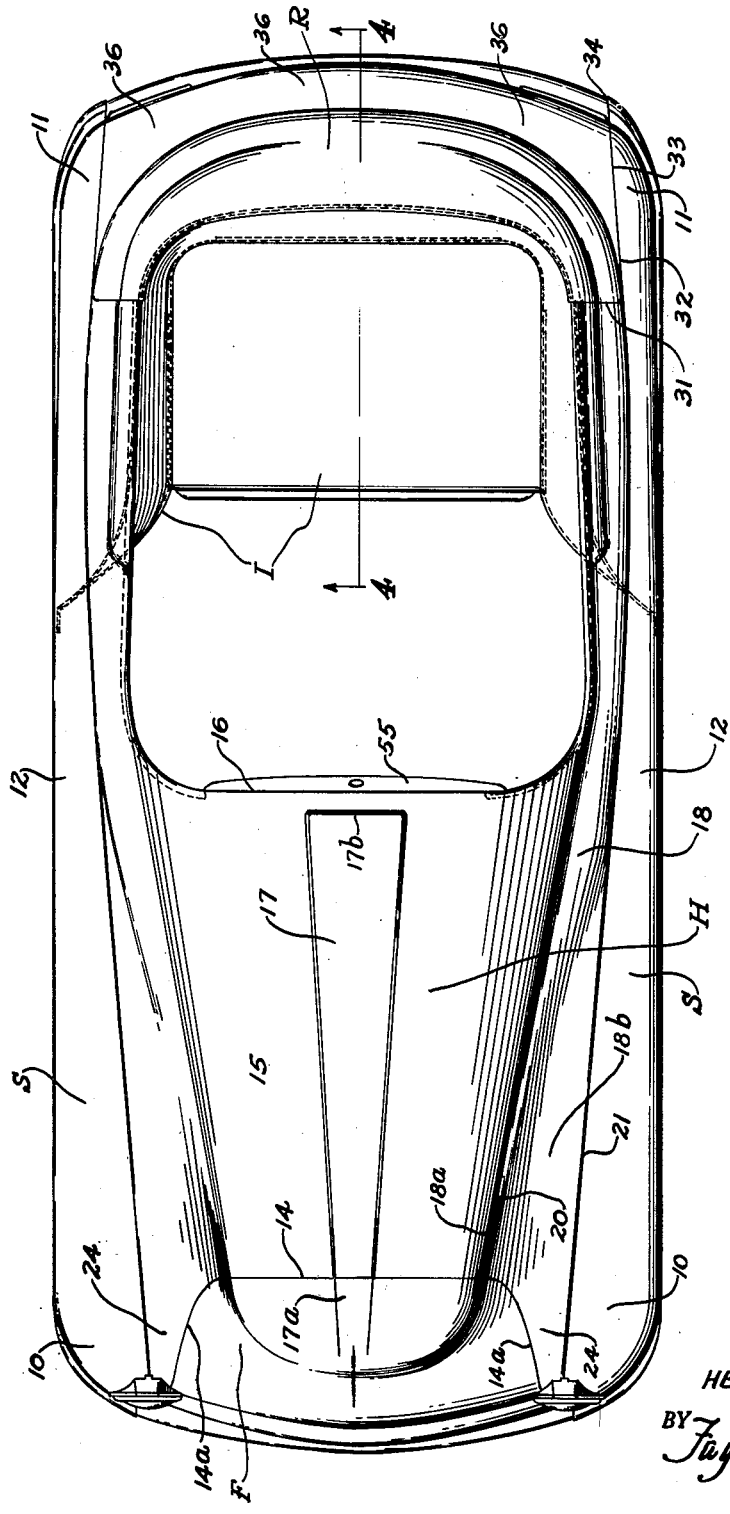
Fig. 2 is a plan view of the body structure shown in Fig. 1.

As shown in Figs. 1 and 2 of the drawings, the exterior of the body fundamentally is constructed of three drawn to shape sheet metal parts comprising a single main member constituting the major part of the hood structure H and integral therewith two side wall structures S which extend throughout the length of the vehicle body—a front panel F which forms the completing part of the hood and a rear deck panel R formed to merge into the seat structure I of the vehicle. The structures of these members hereafter will be described in detail and with reference numerals.

The main body member H—S—S is designed to have relatively deep drawn side formations particularly at the forward and rearward parts 10 and 11 thereof, which, when the connecting hood formation is wrapped upon an assemblying horse, will be disposed in generally vertical positions and become the wheel fenders of the body structure with intermediate integral portions 12 streamlined and connecting the front and rear fender portions 10 and 11. It will be noted that the front fender formations 10 extend a substantial distance forwardly of the front marginal edge 14 of an arched hood formation 15 which is tapered and converged from its steering wheel end 16 forwardly to its front edge 14. A wedge shaped ridge 17 is formed in the hood structure along the top thereof for strengthening purposes. The forward portion thereof serves as a registering means for the front panel as will be explained, and the rear is a stiffening shoulder 17b.

Figure 5:
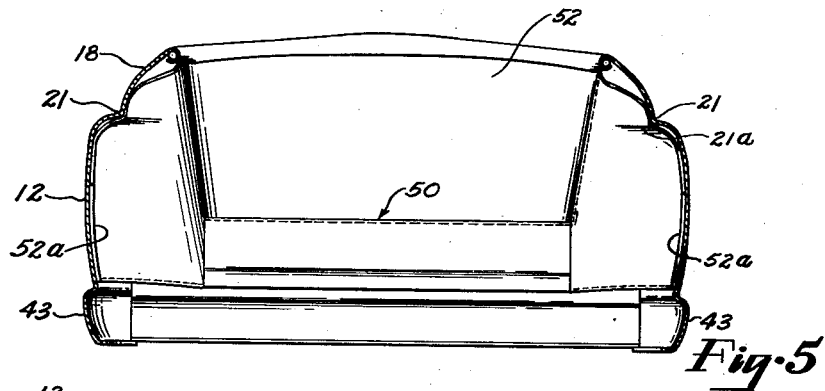
Fig. 5 is a transverse vertical cross section taken substantially along the line 5—5 of Fig. 1.
Figure 6:
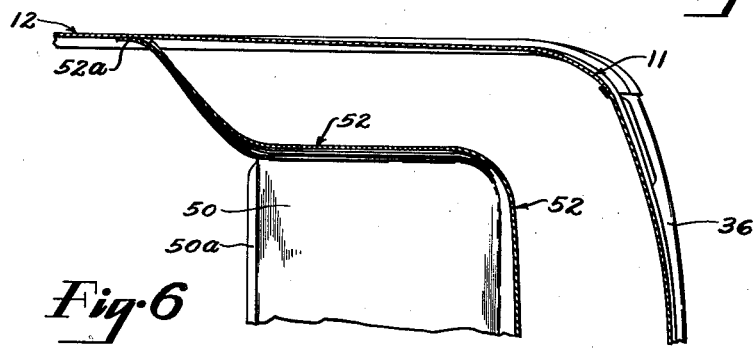
Fig. 6 is a horizontal cross section taken through one of the side walls of the body and seat structure substantially along the line 6—6 of Fig. 2.
Figure 7:
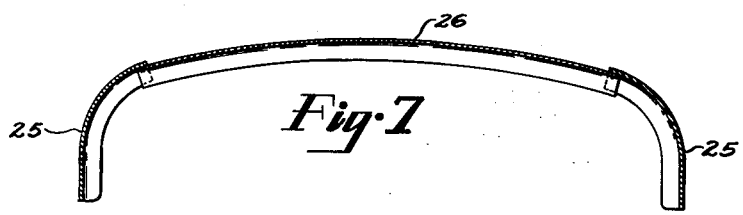
Fig. 7 is a cross sectional detail taken substantially along the line 7—7 of Fig. 1 showing the front bumper construction of the front panel and front fender portions of the body construction.

As shown in Figs. 1 and 5, the fender and side formations extend from front toward the middle regions 12 of the side wall structures in a substantially horizontal direction and an intermediate rolled or curved portion 18 gradually increases in contour from front to back beginning at a point 18a located adjacent the front margin 14. A reversely curved contour 18b originating at the front margin of the hood structure gradually decreases from front to rear as the portion 18 increases in contour to a central region of the side wall structure. Thus, definite lines 20 and 21 effected by ridges in the drawing and forming dies are externally provided which extend generally longitudinally of the body in the hood region and are indicative of corresponding longitudinally extending internal body ridges. The line 21 is continued completely along the sides to the rear panel and around the rear panel as note ridge 21a in Fig. 5. Bumper formations 25 are drawn formed to bulge outwardly at the fronts and sides of the front fender formations.

The front panel F is metal drawn in a general dome shape 22 in the upper part thereof to comprise a continuation and terminus of the hood structure and complementary in shape to the front marginal part 14 of the main hood structure. An arcuate secondarily bulged portion 23 is formed in the front panel member below the dome part 22 with the side termini thereof shaped to be complementary to the curved portions 18b of the inner edges 24 of the front fenders 10. The bulged portion 23 is thus shaped to follow somewhat the upper bulging curvature of the front fender formations. The front panel extends downwardly to the bottoms of the front formations of the fenders and has an outwardly bulged or channel lower marginal structure 26 in the form of a front bumper which is a continuation of front fender bumper formations 25. If desired, a radiator or a grill frame 27 may be formed in the front panel for simulating purposes, which may be of any design that may be simultaneously formed in the panel at the time the general form thereof is being produced in the press.

As shown in Figs. 1 and 2, the main body member H—S—S is joined to the front panel along an arcuate lap seam 14, and along forwardly extending seam continuations 14a which then extend downwardly to the bottom of the front fenders and the front panel. The structure of the seam 14, 14a, etc., may be of any economically practical form. I have found, however, that with the particular front panel structure and main hood structure described, it is practical to hold their shapes in production to fairly over all close tolerances with the result that the margins of the front panel can be held complementary to the margins of the main hood and front fender formations, thus affording a simple spot welded lap joint between these two main members. It should be noted that I have provided a continuation 17a formed in the domed top of the front panel member which slopes forwardly to merging disappearance therewith. While completing the appearance of the formation 17, the formation 17a serves as a gauging or keying means between the main hood part and the front panel when the two members are brought together in an assemblying horse or spot welding jig. Since the bumper formations of the front panel and fenders are complementary, the respective bumper formations also serve to facilitate accurate assemblying of the front panel member F and main body member H—S—S.

Figure 3:
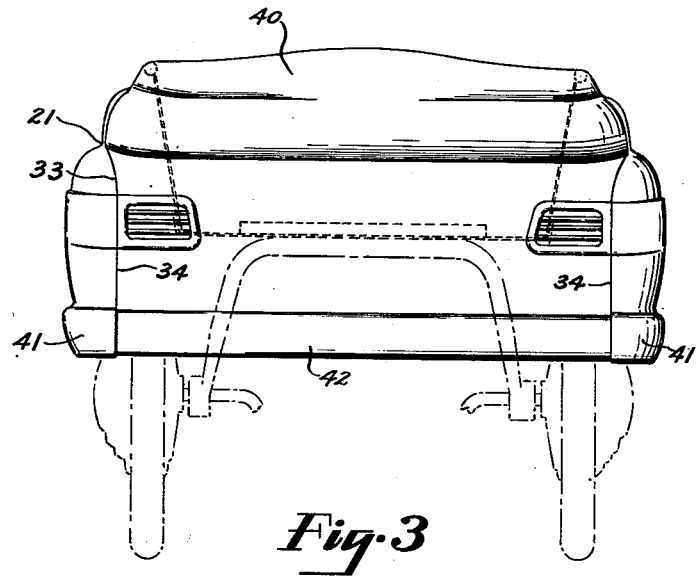
Fig. 3 is a rear elevation of the body structure.
Figure 4:
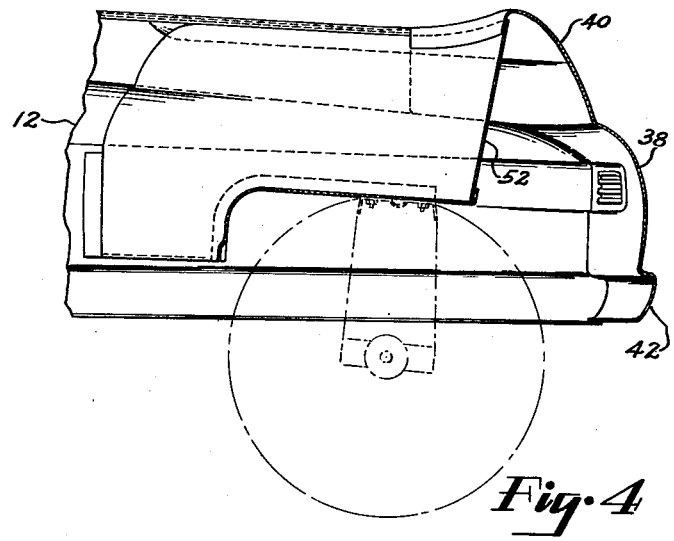
Fig. 4 is a vertical cross section taken through the rear part of the body and the seat structure and taken substantially along the line 4—4 of Fig. 2.

As stated, the sides are continuous from front to rear. The contour of the portions 18 increase somewhat, thus giving a sloping effect to the side wall appearance and to afford ample metal for an upper curled seat rim formation 30. The rear seam between the side structures and the rear panel or deck R begins with a vertically extending seam 31, a rearwardly extending seam 32, a curved fender seam 33 and a downwardly extending offset fender lap seam 34 (see Figs. 1, 2 and 3). The rear deck panel R is a single piece drawn sheet metal member arcuately formed to bulge rearwardly as indicated by reference numeral 36 by way of a continuation of the upper contoured part of the rear fender portions. The upper side portions 38 thereof are in shape a continuation of the shapes of the seat rim parts of the side structures. The sides 38 round into the upper rear portion 40 and both the upper portions 38 and 40 defined by the continuation of the line 21 are provided with a continuously extending curled in seat rim flange to which the seat structure is attached, as will be explained. Thus it will be noted that the contour of the tops of the rear fender formations are continued into the part 38 of the rear panel formation.

Figure 8:
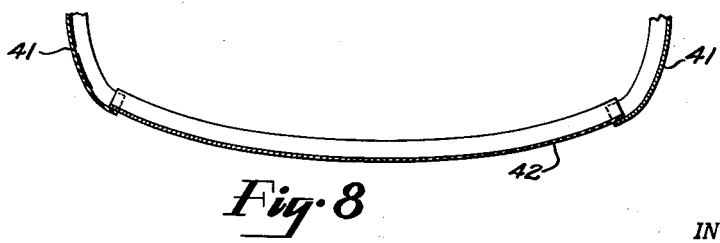
Fig. 8 is a view similar to Fig. 7 but taken through the rear bumper construction substantially along the line 8—8 of Fig. 1.

Along the lower or bottom portions of the rear fender formations 11 are outwardly formed bulges or bumper formations 41 which are complementary to a bumper formation 42 formed across the bottom portion of the rear panel member as shown in Fig. 8. I find that by forming a continuation 43 of the rear fender bumper formations all the way along the bottoms of the side wall structures considerable strength and lateral stiffness is added to the side walls. If desired, rear light simulations 44 may be formed in the rear deck panel at the time this member is being formed in the press. Also an upper rib 45 of the width of the tail light impression 44 may be drawn in the upper regions of the rear fender portions for both added strength and appearance in the body structure.

The seat structure used in the instant body structure is similar to seat structures heretofore used in juvenile automobiles but changed and otherwise modified to obtain a lateral side wall bracing and a better top or rim connection with the side wall structures and the rear panel structure. The seat structure proper may comprise a horizontal seat panel 50 attached to a continuous side and back rest member 52. The inner margin of the member 52 conforms to the inside of the curled in and depending flanges of the side walls and the rear deck panel and is attached thereto as shown in dotted lines at 53 in Fig. 1. The member 52 does not terminate at the forward border of the seat panel 50 but is continued forwardly and is flared outwardly to meet the inside surfaces of the middle regions of the side wall structures. Vertical flange portions 52a are spot welded to the side walls. To further stiffen laterally the seat structure, I have curled down the front end 50a thereof and extended the seat panel connection with the member 52 accordingly. I thus obtain a substantial lateral bracing of the long reaches of the continuous side walls while also obtaining a more comfortable seat structure. Such lateral bracing is obtained with the use of only a small amount of additional metal and the tendency of the side walls to rumble is decreased considerably.

Any desired form of cowl or instrument panel 55 may be installed in the juvenile automobile body hereinbefore disclosed without difficulty. Also it will be noted that the disclosed body structure is adaptable to the use of proven under gear for wheel mounting, pedal driving and steering. The rear wheels and axle, for example, are supported by a bracket 60 indicated by dot and dash lines as being bolted to the under side of the seat panel 50. The front axle and wheels are supported by a bracket 61 attached to the insides of the fender formations. The bracket 61 is horizontally braced by brackets 62 attached to the front panel and the steering post is supported by the cowl panel 55, all of which heretofore has been proven to be reliable practice.

From the foregoing it is apparent that both a protective factor and a body strengthening factor is obtained by having the bumper formations extend across the bottoms of the front and rear panels in coincident relations to bumper formations at the bottom regions of the front and rear fender formations. The shape of the main body member is such that a longitudinal ribbing effect is obtained in the sheet metal forming the hood and integral side structures and the seat structure is such as to provide a lateral bracing of the relatively long side panels.

The top or hood portion of the front panel is keyed to the main hood portion by reason of the hood rib formation 17—17a and the bottom bumper formation thereof is keyed to the front bumper formations of the front fender structures by reason of the nesting relationship of the respective bumper formations during the body assemblying operation. The internal rib formations effected by the die defining of the external lines 20 and 21 produce a stiffening of the sheet metal forming the hood and the top portions of the side wall structures. The continuation 43 of the side wall bumper formations to and around part of the front wheel cut outs laterally stiffens the lower regions of the side wall structures. All of the foregoing as disclosed results in the production of a relatively strong rumble-free body which can be styled along modern passenger car lines, the finish of which is protected at front, rear and sides by the bumper formations.

I claim:

1. In a juvenile vehicle body construction comprising drawn sheet metal parts in which side structures consisting of integral front and rear fender formations formed in a continuous side wall extending from the rear end to front end of the vehicle are joined by rear and front panel members, integral bumper bulges formed in the fender portions and in the panel members along the bottom regions of the respective members, said bumper bulges in the fender portions and in the panel members being in nested relation at the joints of said fender portions and said panel members, integrally formed outwardly bulged channel formations in the upper fender portions adjacent one of said panel members and spaced from said bumper formations, and outwardly bulged formations in said one panel member complementary in form and in nested relation with said channel formations in the joints of said fender portions and said one panel, whereby there is provided four-point keying between the said one panel member and the adjacent fender formations.

2. In a juvenile automobile body construction comprising drawn sheet metal parts, an integral hood and side walls formation with the side walls extending from the front to the back of the body, and front and rear body panel members connecting the front and rear parts of the side walls respectively, the front panel member having a top keying formation therein to fit within a hollow ridge formed on the hood portion, and one of said panels having a channel shaped bottom adapted to fit in nesting relation with complementary channels formed in lower end parts of the side wall structures.

HERMAN L. KRAEFT.

REFERENCES CITED

The following references are of record in the file of this patent:

UNITED STATES PATENTS

| Number | Name | Date |
| --- | --- | --- |
| D. 102,084 | Kraeft | Nov. 24, 1936 |
| D. 147,423 | Smith | Sept. 2, 1947 |
| D. 155,025 | Nanna | Aug. 30, 1949 |
| 2,034,824 | Nelson | Mar. 24, 1936 |
| 2,036,813 | Kraeft | Apr. 7, 1936 |
| 2,084,694 | Martin | June 22, 1937 |
| 2,192,535 | Snell | Mar. 5, 1940 |